United States Patent
Krishnamoorthy et al.

(10) Patent No.: US 10,687,278 B2
(45) Date of Patent: Jun. 16, 2020

(54) ENHANCED RANDOM ACCESS AND WAKE-UP MECHANISM

(71) Applicant: QUALCOMM Incorporated, San Diego, CA (US)

(72) Inventors: Parthasarathy Krishnamoorthy, San Diego, CA (US); Prashanth Mohan, Chennai (IN); Naveen Kumar Pasunooru, Hyderabad (IN); Raevanth Venkat Annam, Hyderabad (IN); Krishnakumar Vasanthasenan, Hyderabad (IN); Muthukumaran Dhanapal, Sunnyvale, CA (US); Shravan Kumar Raghunathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/669,420

(22) Filed: Aug. 4, 2017

(65) Prior Publication Data
US 2019/0045437 A1  Feb. 7, 2019

(51) Int. Cl.
*H04W 52/02* (2009.01)
*H04W 74/08* (2009.01)
(Continued)

(52) U.S. Cl.
CPC ... *H04W 52/0216* (2013.01); *H04W 28/0221* (2013.01); *H04W 72/0446* (2013.01);
(Continued)

(58) Field of Classification Search
CPC ......... H04W 52/0216; H04W 28/0221; H04W 472/0446; H04W 74/0833
See application file for complete search history.

(56) References Cited

U.S. PATENT DOCUMENTS 6,697,346 B1 * 2/2004 Halton ................... H04B 7/216
370/335
9,247,565 B2   1/2016 Bostrom et al.
(Continued)

FOREIGN PATENT DOCUMENTS

EP         0993212 A1    4/2000
WO    WO-2016091602 A1   6/2016
WO     WO2017014715 A1   1/2017

OTHER PUBLICATIONS

Luthra et al., Long Term Evolution for IoT (Narrow Band LTE-Cellular IOT), 3GPP, A Short Note on Design, Technology and Applications, Oct. 11, 2016, 20 Pages.
(Continued)

*Primary Examiner* — Steven H Nguyen
(74) *Attorney, Agent, or Firm* — Holland & Hart LLP

(57) ABSTRACT

Methods, systems, and devices for wireless communication are described. One technique includes identifying, by a user equipment (UE), a periodic time window for the UE to access a network, and transmitting an indication of the periodic time window to the network in a random access channel transmission. The technique also describes receiving, from the network based at least in part on the periodic time window, an indication of uplink resources allocated to the UE during the identified periodic time window. Another technique includes receiving, from a UE in a random access channel transmission, an indication of a periodic time window for the UE to access the network. The technique also includes determining, based at least in part on the periodic time window, uplink resources for the UE to access the network during instances of the identified periodic time window and transmit an indication of the uplink resources.

19 Claims, 15 Drawing Sheets

(51) Int. Cl.
   *H04W 72/04*    (2009.01)
   *H04W 28/02*    (2009.01)
   *H04L 29/08*    (2006.01)
   *H04W 4/70*     (2018.01)

(52) U.S. Cl.
   CPC ......... *H04W 74/0833* (2013.01); *H04L 67/12* (2013.01); *H04W 4/70* (2018.02)

(56) References Cited

U.S. PATENT DOCUMENTS

| | | |
|---|---|---|
| 9,491,780 B2 | 11/2016 | Pang et al. |
| 2012/0250630 A1* | 10/2012 | Paiva ................ H04W 74/0833 370/329 |
| 2016/0302024 A1 | 10/2016 | Bennett et al. |
| 2017/0359780 A1* | 12/2017 | Ji .......................... H04L 1/1829 |
| 2018/0242338 A1* | 8/2018 | Ulrich .................... H04W 4/70 |
| 2019/0081743 A1* | 3/2019 | Loehr ................... H04W 52/02 |

OTHER PUBLICATIONS

International Search Report and Written Opinion—PCT/US2018/040927—ISA/EPO—dated Sep. 19, 2018.

* cited by examiner

ENHANCED RANDOM ACCESS AND WAKE-UP MECHANISM

BACKGROUND

The following relates generally to wireless communication, and more specifically to enhanced random access and wake-up mechanism for wireless devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A network may experience congestion when a network node attempts to communicate too much data, which results in reduced quality of service. Under congested conditions certain UEs, and in particular low-priority UEs, may be barred from accessing the network for the duration of the congestion. Such devices may include low cost UEs or UEs that belong to a particular access class. The delay on network access for these UEs may be further exacerbated during high priority situations, such as when high priority devices are accessing the network. These high priority devices may belong a higher priority access class than the barred UEs. A UE may not be removed from being barred until the network lifts the barring and informs the UE, for example using a paging transmission. Compounding these problems is the possibility that the amount of network congestion present on the network may not be accurately known, for example where paging cycles are large and certain UEs may sleep for long durations.

SUMMARY

This disclosure describes techniques for a user equipment (UE) and a network device, such as a base station in a wireless communication network, to negotiate specific uplink resources for the UE to use in the network. Some UEs, including low priority UEs, may access or attempt to access the network with a certain periodicity. The UE can determine a periodicity and convey an indication of this periodicity with the network in an information element during a random access channel transmission. The network device may determine the periodic time window from the information element, and along with the periodic time windows of any other low priority UEs, the network device may schedule uplink resources for the UEs based on the periodicity communicated by the UE.

While the UE is waiting for the time slots corresponding to the allocated uplink resource to arrive, the UE may enter a sleep mode. Upon waking, the UE may transmit a random access channel transmission to the network device to gain access to the network and transmit using the uplink resources. The UE may periodically sleep and transmit during the periodic time window using the uplink resources allocated by the network device. In the event circumstances or requirements change, the UE may provide an updated periodic time window to the network device and renegotiate the uplink resources based on the updated periodic time window. The network device may store periodic time windows for multiple UEs in the network, and update the periodic time windows, and corresponding uplink resource assignments, when the windows are updated or otherwise modified.

A method of wireless communication is described. The method may include identifying, by the UE, a periodic time window for the UE to access a network, transmitting, to the network in a random access channel transmission, an indication of the identified periodic time window, and receiving, from the network based at least in part on the indication of the identified periodic time window, an indication of uplink resources allocated to the UE for the UE to access the network during the identified periodic time window.

An apparatus for wireless communication is described. The apparatus may include means for identifying, by the UE, a periodic time window for the UE to access a network, means for transmitting, to the network in a random access channel transmission, an indication of the identified periodic time window, and means for receiving, from the network based at least in part on the indication of the identified periodic time window, an indication of uplink resources allocated to the UE for the UE to access the network during the identified periodic time window.

Another apparatus for wireless communication is described. The apparatus may include a processor, memory in electronic communication with the processor, and instructions stored in the memory. The instructions may be operable to cause the processor to identify, by the UE, a periodic time window for the UE to access a network, transmit, to the network in a random access channel transmission, an indication of the identified periodic time window, and receive, from the network based at least in part on the indication of the identified periodic time window, an indication of uplink resources allocated to the UE for the UE to access the network during the identified periodic time window.

A non-transitory computer readable medium for wireless communication is described. The non-transitory computer-readable medium may include instructions operable to cause a processor to identify, by the UE, a periodic time window for the UE to access a network, transmit, to the network in a random access channel transmission, an indication of the identified periodic time window, and receive, from the network based at least in part on the indication of the identified periodic time window, an indication of uplink resources allocated to the UE for the UE to access the network during the identified periodic time window.

In some examples of the method, apparatus, and non-transitory computer-readable medium described above, identifying the periodic time window comprises identifying a periodicity of the periodic time window based at least in part on a parameter of an application running on the UE.

Some examples of the method, apparatus, and non-transitory computer-readable medium described above may further include processes, features, means, or instructions for detecting congestion in the network, wherein identifying the periodic time window may be based at least in part on the detected congestion.

Some examples of the method, apparatus, and non-transitory computer-readable medium described above may further include processes, features, means, or instructions for determining, by the UE, that parameters for to the periodic time window may have changed. Some examples of the method, apparatus, and non-transitory computer-readable medium described above may further include processes, features, means, or instructions for transmitting, to the network, an indication of an updated periodic time window in a second random access channel transmission.

Some examples of the method, apparatus, and non-transitory computer-readable medium described above may further include processes, features, means, or instructions for entering, by the UE, a sleep mode until an instance of the identified periodic time window based at least in part on the received indication of uplink resources.

Some examples of the method, apparatus, and non-transitory computer-readable medium described above may further include processes, features, means, or instructions for awakening the UE for the instance of the periodic time window. Some examples of the method, apparatus, and non-transitory computer-readable medium described above may further include processes, features, means, or instructions for transmitting, to the network, a random access channel report during the instance of the periodic time window.

In some examples of the method, apparatus, and non-transitory computer-readable medium described above, the indication of the identified periodic time window comprises an information element in the random access channel transmission.

In some examples of the method, apparatus, and non-transitory computer-readable medium described above, identifying the periodic time window comprises identifying the periodic time window for the UE to access the network based at least in part on a data requirement for the UE, or a time when network access may be desired by the UE, or a duration of network access desired by the UE, or a combination thereof.

Some examples of the method, apparatus, and non-transitory computer-readable medium described above may further include processes, features, means, or instructions for entering a sleep mode, based at least in part on the received indication of uplink resources, for a duration that exceeds a hyper system frame number (SFN) cycle for the UE.

In some examples of the method, apparatus, and non-transitory computer-readable medium described above, the UE may be an Internet-of-Things device that may have a maximum network speed cap.

A method of wireless communication is described. The method may include receiving, from a UE in a random access channel transmission, an indication of a periodic time window for the UE to access the network, determining, based at least in part on the received indication of the periodic time window, uplink resources for the UE to access the network during instances of the identified periodic time window, and transmitting, to the UE, an indication of the determined uplink resources.

An apparatus for wireless communication is described. The apparatus may include means for receiving, from a UE in a random access channel transmission, an indication of a periodic time window for the UE to access the network, means for determining, based at least in part on the received indication of the periodic time window, uplink resources for the UE to access the network during instances of the identified periodic time window, and means for transmitting, to the UE, an indication of the determined uplink resources.

Another apparatus for wireless communication is described. The apparatus may include a processor, memory in electronic communication with the processor, and instructions stored in the memory. The instructions may be operable to cause the processor to receive, from a UE in a random access channel transmission, an indication of a periodic time window for the UE to access the network, determine, based at least in part on the received indication of the periodic time window, uplink resources for the UE to access the network during instances of the identified periodic time window, and transmit, to the UE, an indication of the determined uplink resources.

A non-transitory computer readable medium for wireless communication is described. The non-transitory computer-readable medium may include instructions operable to cause a processor to receive, from a UE in a random access channel transmission, an indication of a periodic time window for the UE to access the network, determine, based at least in part on the received indication of the periodic time window, uplink resources for the UE to access the network during instances of the identified periodic time window, and transmit, to the UE, an indication of the determined uplink resources.

Some examples of the method, apparatus, and non-transitory computer-readable medium described above may further include processes, features, means, or instructions for determining periodic time windows for at least one additional UE, wherein determining uplink resources for the UE may be based at least in part on the determined periodic time windows for the at least one additional UE.

Some examples of the method, apparatus, and non-transitory computer-readable medium described above may further include processes, features, means, or instructions for transmitting, by the network device, an indication of an increased barring time for the UE based at least in part on the received indication of the periodic time window.

Some examples of the method, apparatus, and non-transitory computer-readable medium described above may further include processes, features, means, or instructions for storing an indication of the periodic time window for the UE with an identifier of the UE.

Some examples of the method, apparatus, and non-transitory computer-readable medium described above may further include processes, features, means, or instructions for receiving, from the UE, an indication of an updated periodic time window in a second random access channel transmission. Some examples of the method, apparatus, and non-transitory computer-readable medium described above may further include processes, features, means, or instructions for determining, based at least in part on the updated periodic time window, updated uplink resources for the UE. Some examples of the method, apparatus, and non-transitory computer-readable medium described above may further include processes, features, means, or instructions for transmitting, to the UE, an indication of the updated uplink resources.

Some examples of the method, apparatus, and non-transitory computer-readable medium described above may further include processes, features, means, or instructions for storing an updated indication of the updated periodic time window for the UE with an identifier of the UE.

DETAILED DESCRIPTION

Figure 1:
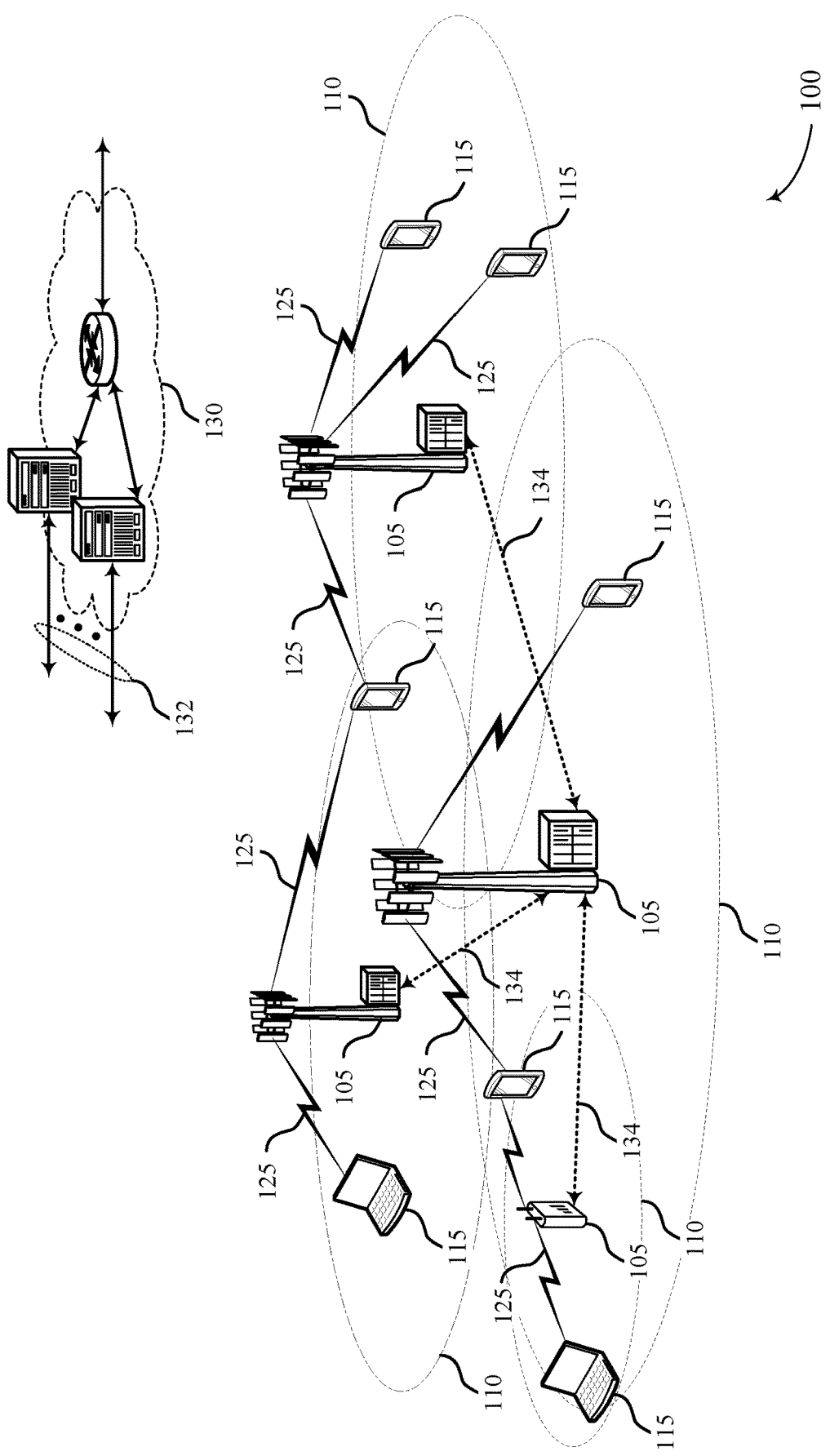
FIG. 1 illustrates an example of a system for wireless communication that supports enhanced random access and wake-up mechanism for wireless devices in accordance with aspects of the present disclosure.

Some user equipments (UEs) may be blocked from accessing a network at certain times, such as under conditions of high congestion in the network. For example, some UEs are subjected to extended access barring in order to avoid radio access network (RAN) congestion. Such UEs may include low-priority UEs, for example UEs whose access class is low, or lower than other UEs in the network. Data from a barred UE may be further delayed under some high priority situations because the barring time may be increased. A barred UE generally will not attempt to access the network while it is barred. The UE may not be removed from barring until the network lifts the barring restriction and pages the UE to inform the UE of the lifted restriction. Furthermore, in circumstances where paging hyper system frame number (SFN) cycles are large and the UE wakes up after a long duration of deep sleep, the UE may get inaccurate information about network congestion. Techniques described herein reduce the possibility of a UE getting barred, increases avoidance of RAN congestion, reduces the chance of the UE getting inaccurate information about congestion, and saves power at the UE.

Extended access barring may be introduced during periods of high congestion at a network node to bar certain classes of network devices (e.g., UEs) from accessing the network. The UEs may be low cost devices, devices with a maximum network speed cap, and/or category M devices. Category M devices follow the Long Term Evolution (LTE) category 1 standard, which is described in documents from the organization named "3rd Generation Partnership Project" (3GPP). Category M devices generally have low power consumption, low cost, and have speeds capped at 10 megabits per second (Mb/s). The UEs may additionally or alternatively belong to a particular access class, such as one of Range Access Class 0-9, as described by 3GPP. In some examples, the UE may be a machine type communication Internet of Things (IoT) device.

According to the techniques described herein, a UE and a network can negotiate specific times for the UE to access uplink (UL) resources in the network. Low priority UEs, including low cost or Category M UEs, may have a certain periodicity with which they want to access the network. This periodicity may vary uniquely across UEs, and the periodicity may be based at least partially on applications running on the UE. In order to increase the chances of the UE accessing the network, and to reduce power consumption of the UE even further, the UE conveys and negotiates this unique periodicity with the network. Thus, the network may be able to efficiently schedule uplink resources for the UE based on the periodicity communicated by the UE.

In order to perform this negotiation, the UE may determine the periodic time at which the UE usually performs random access to access the network. The UE may determine the times, and thus the period, based on data mining techniques for when the UE may need access to the network. A periodic time window is defined in which the UE usually periodically accesses the network and may send a random access channel (RACH) report. The UE may then provide a network node of the network with an indication of the periodic time window. In one example, the UE provides such indication in an information element in a RACH report in a random access channel transmission to the network. In some examples, the information element may be an information element dedicated to the purpose of conveying periodic time windows.

The network may receive the random access channel transmission with the indication of the periodic time window (e.g., in the information element). The network may identify the periodic time window and assign UL resources to the UE during the periodic time window. The network may transmit an indication of the UL resources to the UE. The network may store information about the UE, such as an identifier of the UE and the periodic time window indicated by the UE. The network, for example at the network node, may store a table including periodic time windows and identifiers for multiple wireless devices in the network. The network may use the table with multiple periodic time windows from multiple devices, in addition to other network information, to efficiently schedule uplink resources for the UE.

Once the UE receives the indication of scheduled UL resources for the UE from the network, for example in a transmission from a base station of the network, the UE may go to sleep until the periodic time window. The scheduled UL resources may be during the periodic time window. The UE may skip the hyper SFN cycle and go to sleep because the UE already negotiated the uplink resources and the timing with the network. The UE may go into a deep sleep until the periodic time window or until the time that the UL resources are available to the UE, which may be during the periodic time window. In some cases, if the network does not, or is unable, to schedule the UL resource during the periodic time window as specified by the indication of the periodic time window, the UE may revert to UE's original behavior. For example, the UE may wake up whenever the data to transmit is present in the UL buffer of the UE.

If the network resources needed by the UE changes, the UE and the network can renegotiate the UL resources. The UE can send a new RACH report indicating the changed periodic time window. In that case, the network may reschedule the UL resources and update the stored information about the UE.

These techniques may reduce RAN congestion because the UE is able to calculate the periodic time window and access the network only periodically in the predefined time slots. The UE may save power because the UE can enter a deep sleep for longer periods of time as well as perform fewer failed attempts to access the network. The UE may not need to follow the hyper SFN cycle because the UE knows when to sleep and when to wake up based on the UL resources received from the network.

Aspects of the disclosure are initially described in the context of a wireless communications system. Various swim diagrams are provided which illustrate actions taken by a wireless communication system with enhanced random access and wake-up mechanisms. A block diagram illustrates an example random access message that includes an information element containing the periodic time window. Aspects of the disclosure are further illustrated by and described with reference to apparatus diagrams, system diagrams, and flowcharts that relate to enhanced random access and wake-up mechanism.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a network node, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an IoT device, an Internet of Everything (IoE) device, or an MTC device, or the like, which may be implemented in various articles such as appliances, vehicles, meters, or the like. A UE 115 may be a low cost device, a device with a maximum network speed cap, and/or a category M device.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with core network 130 and with one another. For example, base stations 105 may interface with core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. Core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A UE 115 and a base station 105 negotiate a periodic time window and uplink resources for a UE 115 to access the network. UE 115 may determine a periodic time window for it to access the network based on historical times of accessing the network, one or more applications running on UE 115, network needs, data requirements, duration of access needed, and the like. UE 115 may transmit the periodic time window to base station 105 in an information element to base station 105, for example as an information element in a random access channel transmission. Base station 105 may identify the periodic time window and use it to schedule uplink resources for UE 115. Once the uplink resources are scheduled, base station 105 may transmit an indication of the uplink resources to the UE 115. UE 115 may sleep until the periodic time window or the uplink resources are available.

One or more of the base stations 105 may include a BS scheduling manager, which may receive, from UE 115 in a random access channel transmission, an indication of a periodic time window for UE 115 to access the network. The BS scheduling manager may also determine, based at least in part on the received indication of the periodic time window, uplink resources for UE 115 to access the network during instances of the identified periodic time window and transmit an indication of the determined uplink resources to UE 115.

One or more of UEs 115 may include a UE scheduling manager, which may identify a periodic time window for UE 115 to access a network. The UE scheduling manager may transmit, to the base station 105 in a random access channel transmission, an indication of the identified periodic time window. The UE scheduling manager may receive from the network based at least in part on the indication of the identified periodic time window, an indication of uplink resources allocated to UE 115 for it to access the network during the identified periodic time window.

Figure 2:
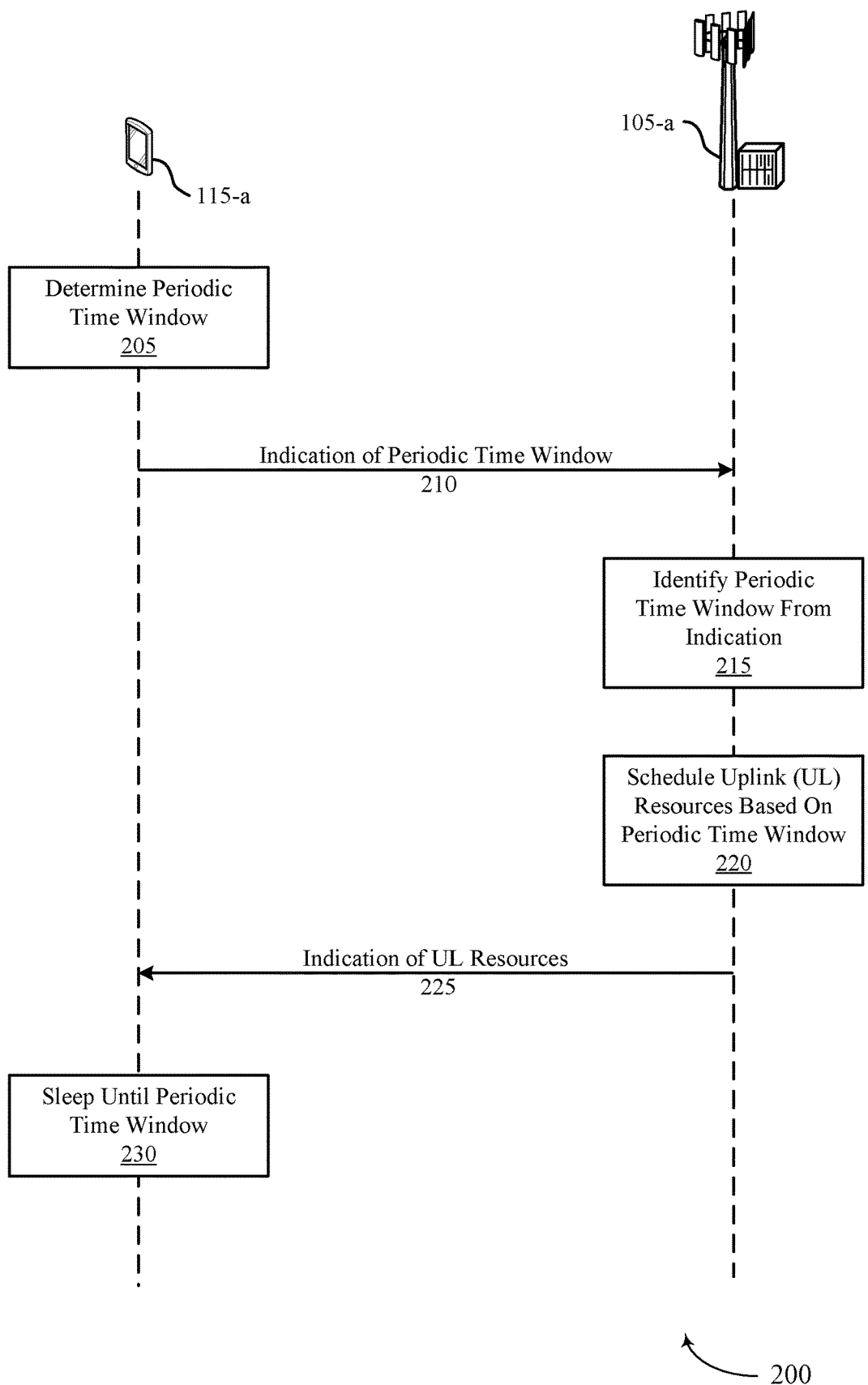
FIG. 2 illustrates an example of a swim diagram that supports enhanced random access and wake-up mechanism for wireless devices in accordance with aspects of the present disclosure.

FIG. 2 illustrates an example of a swim diagram 200 that supports enhanced random access and wake-up mechanisms in accordance with various aspects of the present disclosure. In some examples, the swim diagram 200 may implement aspects of wireless communications system 100. The UE 115-a may be an example of aspects of a UE 115 as described herein. The base station 105-a may be an example of aspects of a base station 105 as described herein.

UE 115-a may determine a periodic time window at block 205. A periodicity of the periodic time window may be determined or identified based at least in part on a parameter of an application running on UE 115-a. In some examples, identifying the periodic time window for the UE 115 to access the network based at least in part on a data requirement for the UE, or a time when network access is desired by the UE, or a duration of network access desired by the UE, or a combination thereof.

Once the periodic time window is determined, UE 115-a may transmit an indication of the periodic time window 210 to base station 105-a. The indication of the periodic time window 210 may be a random access channel transmission and the indication of the identified periodic time window may be an information element in the random access channel transmission. For example, the information element may be a low priority access time window (LPATW) information element. The information element may be included a RACH report. In some examples, the information element may be included in a different type of message, such as a tracking area update request.

Upon receiving the transmission from UE 115-a, base station 105-a may identify the indication of the periodic time window at block 215. Base station 105-a may read the information element including the indication of the periodic time window. Base station 105-a may schedule uplink resources for UE 115-a based on the periodic time window at block 220. Base station 105-a may transmit an indication of the uplink resources 225 to the UE 115-a.

UE 115-a receives the indication of uplink resources 225 indicating the uplink resources from base station 105-a. UE 115-a may enter a sleep mode until the periodic time window at block 230. UE 115-a may enter the sleep mode until an instance of the identified periodic time window based at least in part on the received indication of uplink resources. That is, UE 115-a may wake up at or before the predetermined time slots associated with the uplink resources allocated to UE 115-a. In some examples, UE 115-a may entering the sleep mode for a duration that exceeds a hyper SFN cycle.

Figure 3:
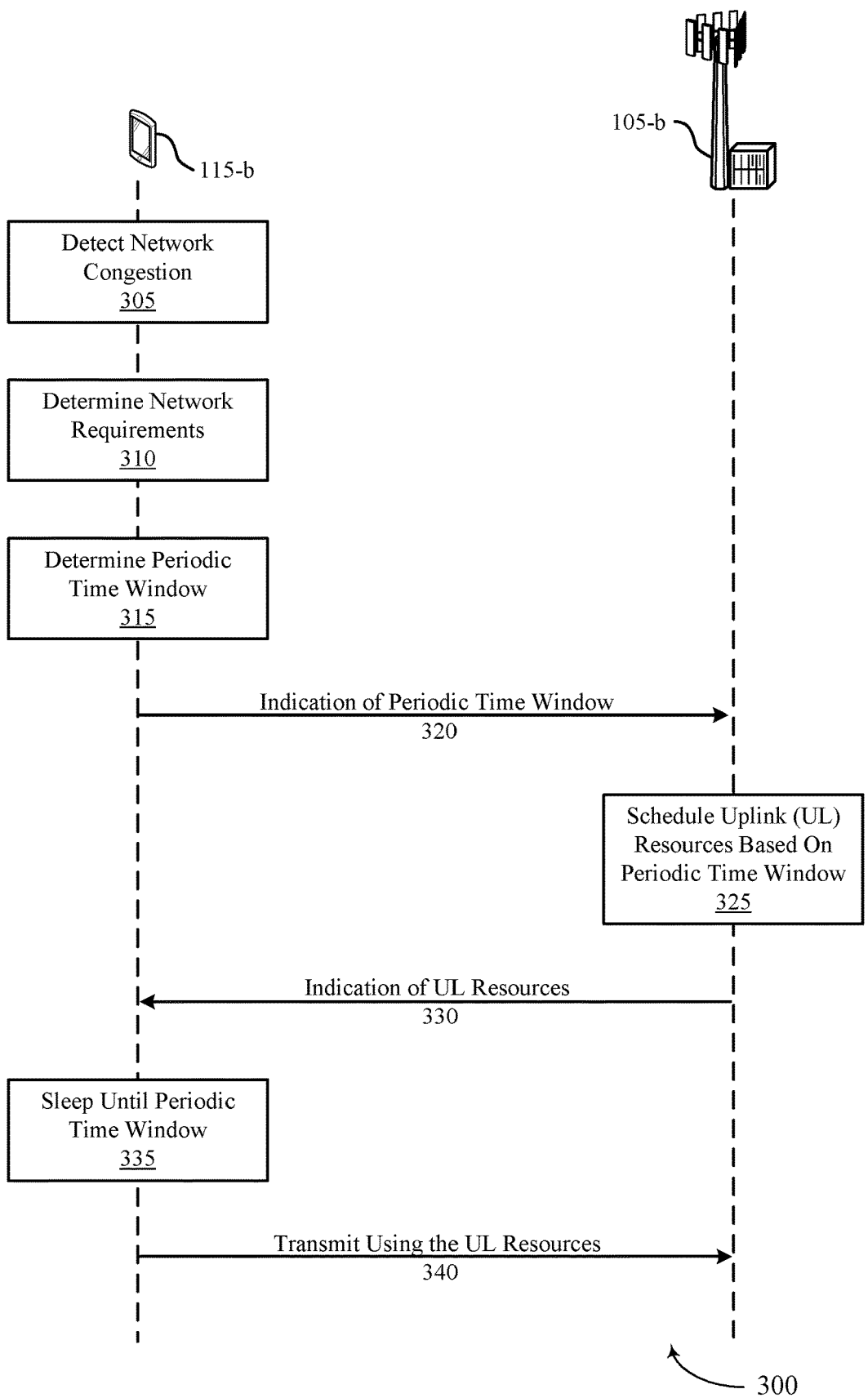
FIG. 3 illustrates an example of a swim diagram that supports enhanced random access and wake-up mechanism in accordance with aspects of the present disclosure.

FIG. 3 illustrates an example of a swim diagram 300 that supports enhanced random access and wake-up mechanisms in accordance with various aspects of the present disclosure. In some examples, the swim diagram 300 may implement aspects of wireless communications system 100. The UE 115-b may be an example of aspects of a UE 115 as described herein. The base station 105-b may be an example of aspects of a base station 105 as described herein.

At block 305, UE 115-b may detect network congestion. Network congestion may be detected by various techniques, such as receiving an indication of network congestion from base station 105-b (or from another base station 105 or network node of the network), being barred from accessing the network, or measuring the quality of service on the network. The indication of network congestion may be generated by base station 105-b in response to a detection of a congestion condition at one or more nodes of the RAN.

At block 310, UE 115-b may determine its network requirements. The network requirements may be based on data requirements, one or more applications running on UE 115-b, when UE 115-b typically accesses the network, a requirement for a duration of network access, the type of network, the type of UE 115-b, one or more tasks performed by or to be performed by UE 115-b, one or more additional devices associated with UE 115-b, historical network needs of UE 115-*b*, or the like. From values associated with one or more of these requirements, UE 115-*b* may determine a periodic time window. In particular, UE 115-*b* may determine the periodic window based on the prior history of data arrival at the UL buffer of UE 115-*b*, or based on registered IOT application events, or both. The periodic time window may be a time at which UE 115-*b* would usually desire or request to access the network.

Once UE 115-*b* determines the periodic time window, it transmits an indication of the periodic time window 320 to a base station 105-*b*. UE 115-*b* may transmit indication of periodic time window 320 during one of the periodic time windows. Indication of periodic time window 320 may be transmitted in a random access channel transmission. The indication of periodic time window 320 may also be included in a RACH report within the random access channel transmission. For example, the RACH report may indicate support for wireless devices, such as UE 115-*b*, indicating that such wireless devices are capable of operating according to the described periodic time windows. The RACH report may, for example, include a single bit to indicate whether the wireless device has such capability.

Base station 105-*b* receives the indication of periodic time window 320, processes it to determine the periodic time window for UE 115-*b*, and schedules uplink resources for UE 115-*b* based on the periodic time window at block 325. The scheduled uplink resources may also be based on other factors and conditions of the network, such as network congestion, high priority traffic, other UEs 115 associated with the network, data requirements, network speed, and link conditions or quality. Base station 105-*b* transmits an indication of the uplink resources 330 to UE 115-*b*.

UE 115-*b* may receive the indication of uplink resources 330 and identify the uplink resources assigned to it at block 335. UE 115-*b* may determine one or more time slots corresponding to the uplink resources. In some examples, the one or more time slots corresponding to the uplink resources are schedule to be within instances of the periodic time window. In other examples, some of the time slots corresponding to the uplink resources are our outside of instances of the periodic time window, and some of the time slots may be within instances of the periodic time window.

At block 335, UE 115-*b* may sleep until the periodic time window or the one or more time slots corresponding to the uplink resources occur. In some examples, UE 115-*b* wakes up at the earliest of the periodic time window or the one or more time slots, if the one or more time slots are not within the periodic time window. In other examples, UE 115-*b* wakes up at or before the one or more time slots. In some examples, UE 115-*b* may enter and be in a deep sleep mode until the one or more time slots. UE 115-*b* may not go to sleep between transmitting the indication of the periodic time window 320 and receiving the indication of uplink resources 330.

Once UE 115-*b* wakes up, UE 115-*b* may transmit one or more messages 340 using the allocated uplink resources. One or more of the messages 340 may be random access channel transmissions. One or more of the messages 340 may include data for one or more applications run by UE 115-*b*. UE 115-*b* may provide an additional indication of a periodic time window in one or more of the messages 340 if, for example, the periodic time window has changed. Otherwise, UE 115-*b* may continue to use the allocated UL resources periodically.

Figure 4:
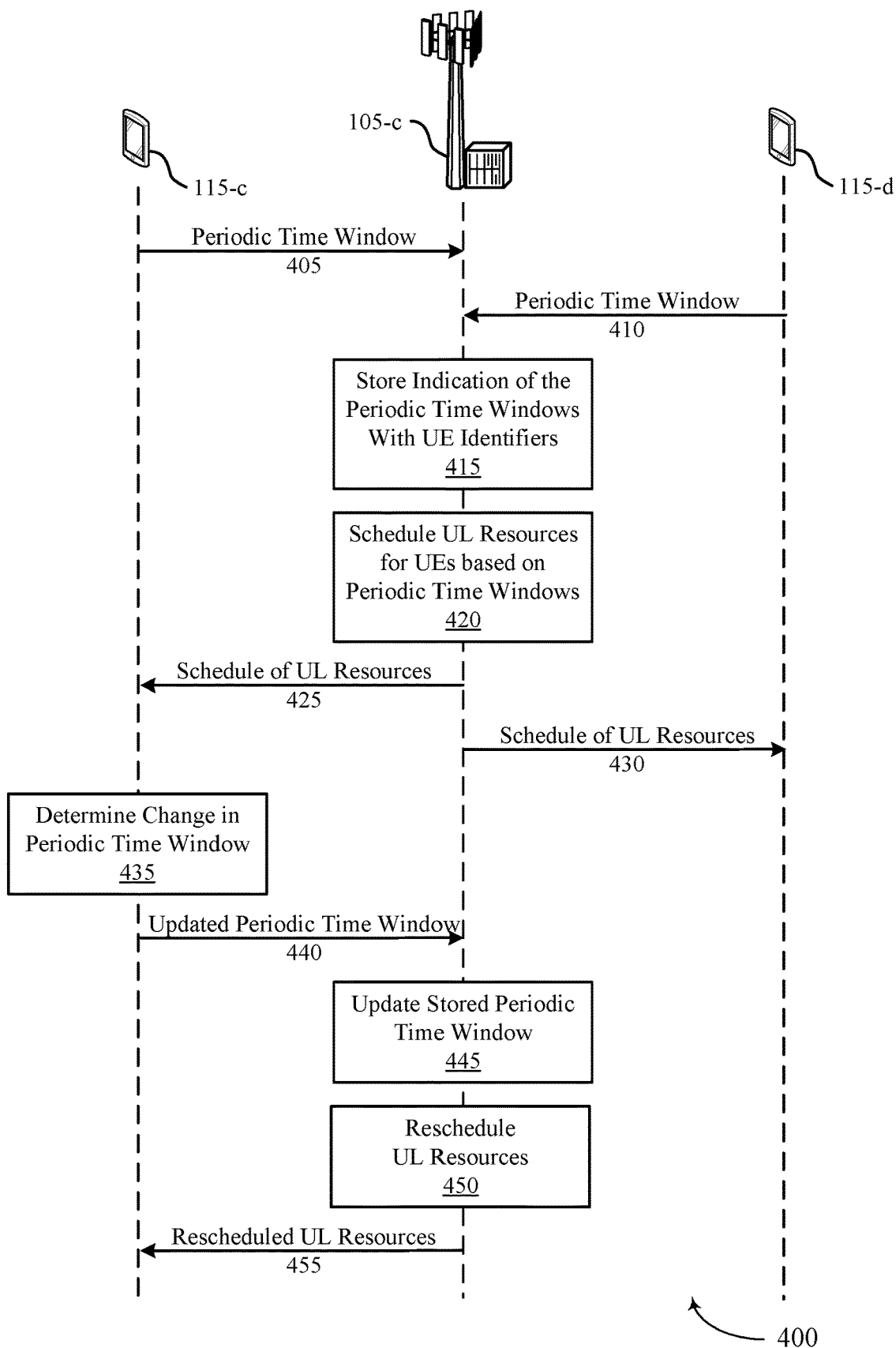
FIG. 4 illustrates an example of a swim diagram that supports scheduling uplink resources for multiple wireless devices using an enhanced random access and wake-up mechanism in accordance with aspects of the present disclosure.

FIG. 4 illustrates an example of a swim diagram 400 that supports scheduling uplink resources for multiple wireless devices using an enhanced random access and wake-up mechanism in accordance with aspects of the present disclosure. In some examples, swim diagram 400 may implement aspects of wireless communications system 100. UEs 115-*c* and 115-*d* may be an example of aspects of a UE 115 as described herein. Base station 105-*c* may be an example of aspects of a base station 105 as described herein.

FIG. 4 shows two UEs 115-*c* and 115-*d* as part of a network with base station 105-*c*. UE 115-*c* may transmit an indication of a periodic time window 405 to base station 105-*c*. Likewise, UE 115-*d* may transmit an indication of a periodic time window 410 to base station 105-*c*. The periodic time windows 405 and 410 may be determined as described herein.

Base station 105-*c* may store indications of the periodic time windows 405 and 410 (including other periodic time windows that base station 105-*c* receives) at block 415. The periodic time windows 405 and 410 may be stored along with identifiers for UEs 115-*c* and 115-*d*, respectively. The identifiers may be unique to each UE 115. Base station 105-*c* may store the periodic time windows and UE identifiers in a database or table, for example.

Base station 105-*c* may schedule uplink resource for each UE 115 based on their periodic time windows at block 420. Base station 105-*c* may determine the schedule based on multiple periodic time windows for the multiple UEs. For example, base station 105-*c* may determining periodic time windows for at least one additional UE, wherein determining uplink resources for the UE is based at least in part on the determined periodic time windows for the at least one additional UE. Base station 105-*c* may refer to the data stored regarding the periodic time windows in scheduling uplink resources. Base station 105-*c* may transmit the schedule of the allocated uplink resources for each UE, such as in message 425 and 430 to UEs 115-*c* and 115-*d*, respectively. These uplink resources may be scheduled to the respective UE 115 for each periodic time window of the UE 115.

One or more of the UEs 115 may, at some point, change its periodic time window. For example, UE 115-*c* determines that there is a change in its periodic time window at block 435. Based on this, UE 115-*c* may transmit an updated periodic time window message 440 to base station 105-*c*. UE 115-*c* may transmit updated periodic time window message 440 using uplink resources that were previously allocated to UE 115-*c* by base station 105-*c*, for example. The updated periodic time window message 440 may include an information element indicating the updated periodic time window.

Having received updated periodic time window message 440 identifying a new periodic time window, base station 105-*c* may update the stored periodic time window at block 445. Based on the new periodic time window, base station 105-*c* may reschedule uplink resources for UE 115-*c* at block 450. Base station 105-*c* may transmit a message 455 to UE 115-*c* that indicates the rescheduled uplink resources. UE 115-*c* may proceed to use the newly rescheduled uplink resources for the next updated periodic time windows.

Figure 5:
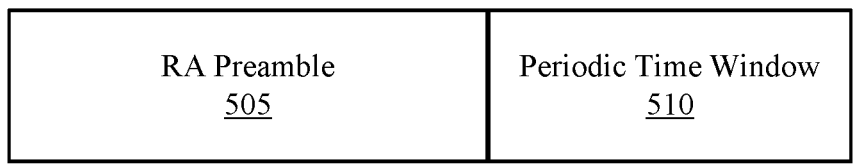
FIG. 5 illustrates an example block diagram of a random access channel message that includes an information element indicating a periodic window time in accordance with aspects of the present disclosure.

FIG. 5 illustrates an example block diagram of a random access channel message 500 that includes an information element indicating a periodic window time in accordance with aspects of the present disclosure. In some examples, random access channel message 500 may be implemented by aspects of wireless communications system 100.

The random access channel message 500 includes a random access preamble 505, and a periodic time window information element 510. A UE may generate and transmit the random access channel message 500, including determining the periodic time window information element 515.

A base station may receive and process the random access channel message 500 in order to provide network access to the UE.

The random access preamble 505 may be any random access preamble used by a UE to obtain access to a network. The periodic time window information element may be a low priority access window time (LPAWT). Random access channel message 500 may be part of a RACH report. The RACH report may be a third message (MSG3) RRC connection request of an RRC connection establishment (or reestablishment) procedure. The RACH report may include a 1 bit information element to indicate whether UE 115 is LPAWT capable UE (or not). UE 115 may indicate the LPAWT duration using an attach request, or a Tracking Area Update (TAU) Request, or some combination thereof. In some examples, if the UE wants to update a timer for the LPAWT (e.g., to increase or decrease the duration of such time), UE 115 may perform a TAU procedure. In some examples, an allowable range for the LPAWT indicated by UE 115 may be from 5 minutes to 1 day, or from 5 minutes to 1 month. The indicated time window may be based on a type of IOT application.

Figure 6:
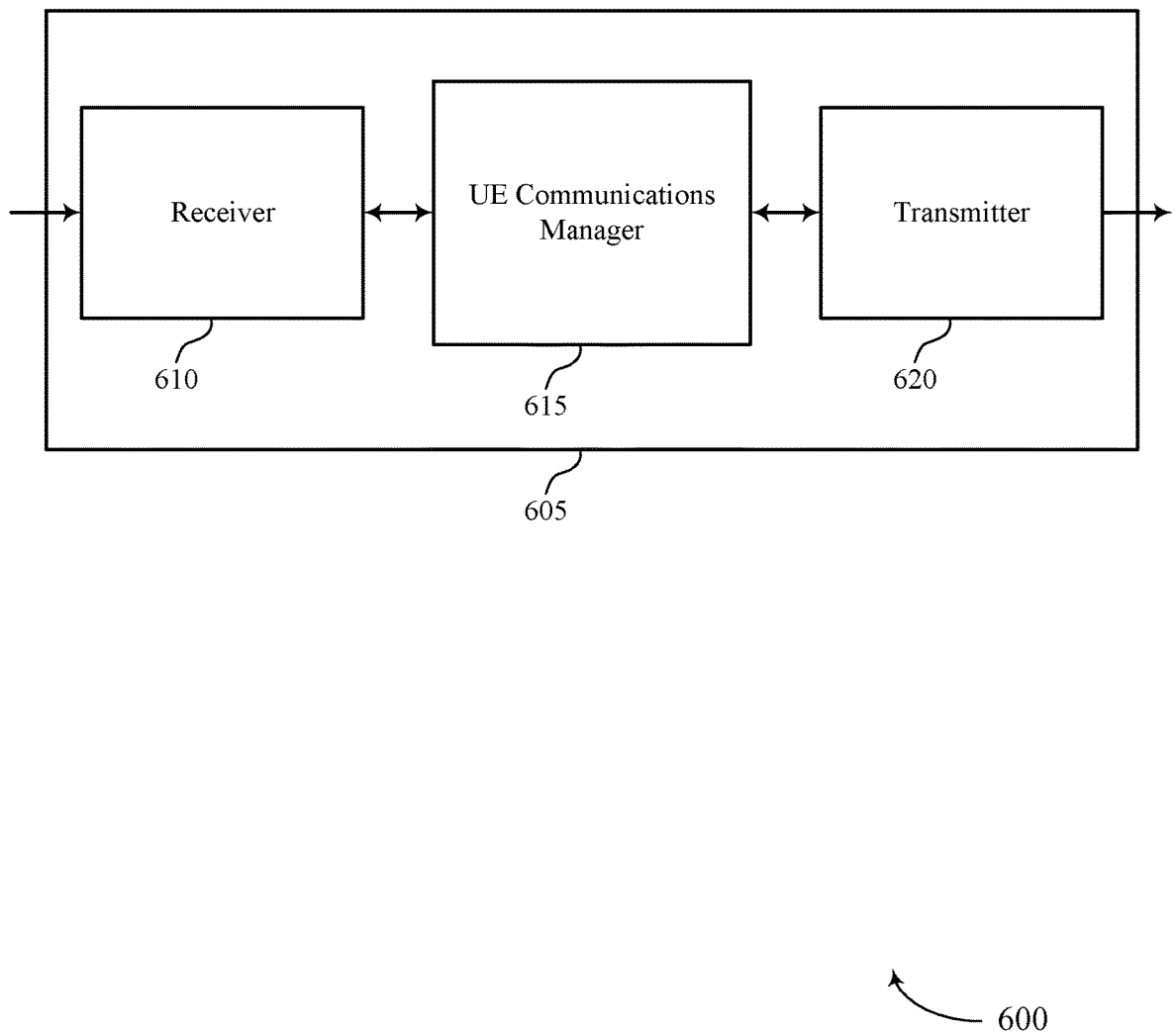
FIGS. 6 through 8 show block diagrams of a device that supports enhanced random access and wake-up mechanism in accordance with aspects of the present disclosure.

FIG. 6 shows a block diagram 600 of a wireless device 605 that supports enhanced random access and wake-up mechanism in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses). In some cases, the wireless device 605 is an Internet-of-Things device that has a maximum network speed cap.

Receiver 610 may receive information such as packets, user data, or control information associated with various information channels (e.g., control channels, data channels, and information related to enhanced random access and wake-up mechanism, etc.). Information may be passed on to other components of the device. Receiver 610 may be an example of aspects of a transceiver 935 described with reference to FIG. 9. Receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify, by the UE, a periodic time window for the UE to access a network. UE communications manager 615, utilizing transmitter 620, may transmit an indication of the identified periodic time window to the network in a random access channel transmission. UE communications manager 615, utilizing receiver 610, may receive, from the network based on the indication of the identified periodic time window, an indication of uplink resources allocated to the UE for the UE to access the network during the identified periodic time window.

Transmitter 620 may transmit signals generated by other components of the device. In some examples, transmitter 620 may be collocated with receiver 610 in a transceiver. For example, transmitter 620 may be an example of aspects of the transceiver 935 described with reference to FIG. 9. Transmitter 620 may utilize a single antenna or a set of antennas.

Figure 7:
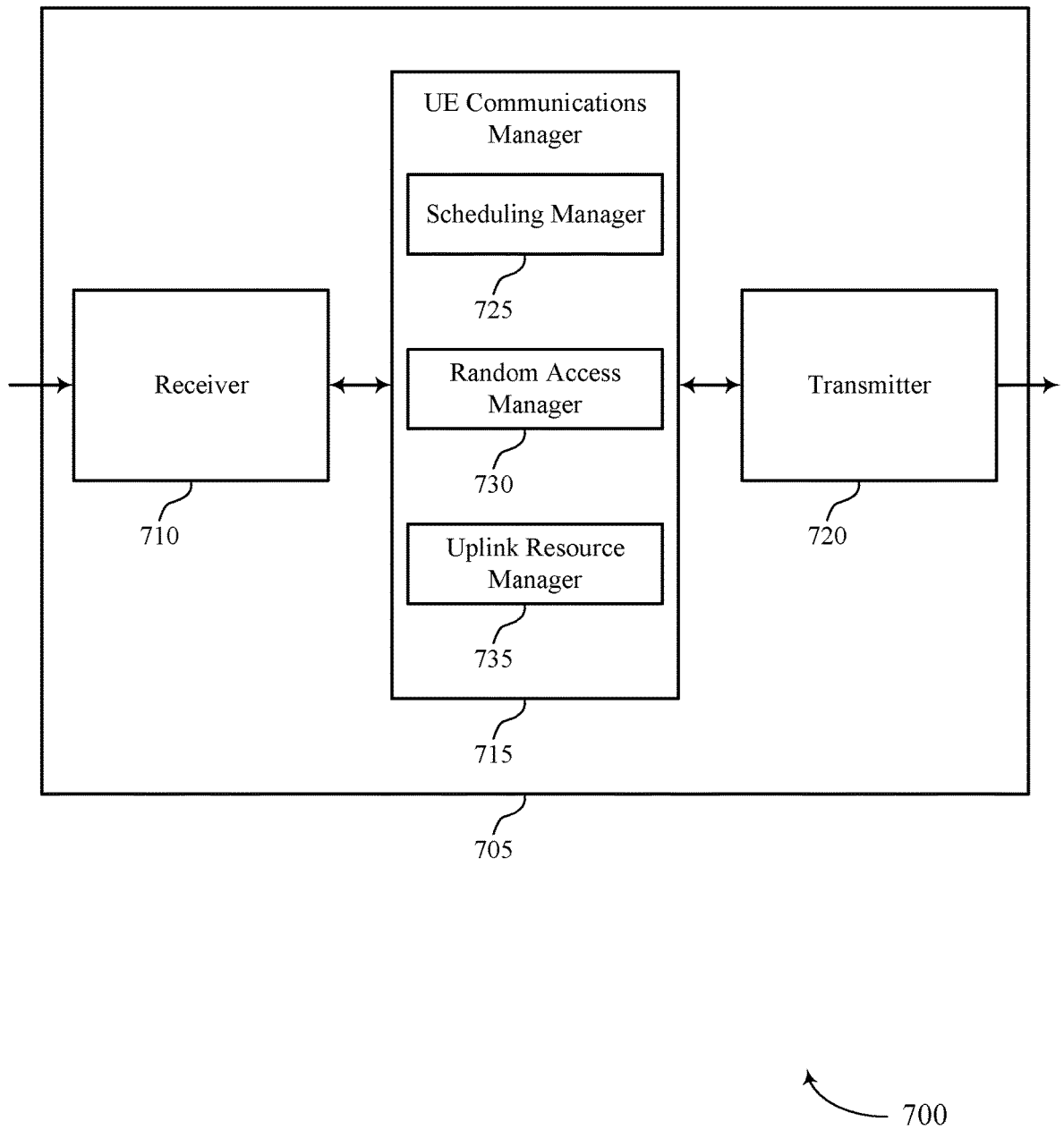

FIG. 7 shows a block diagram 700 of a wireless device 705 that supports enhanced random access and wake-up mechanism in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to enhanced random access and wake-up mechanism, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include a scheduling manager 725, a random access manager 730, and an uplink resource manager 735.

Scheduling manager 725 may identify a periodic time window for the wireless device 705 to access a network. Scheduling manager 725 may also detect congestion in the network. In some examples, identifying the periodic time window is based on the detected congestion. Scheduling manager 725 may determine that parameters for the periodic time window have changed. In some cases, identifying the periodic time window includes identifying a periodicity of the periodic time window based on a parameter of an application running on the UE. In some cases, the indication of the identified periodic time window includes an information element in the random access channel transmission. In some examples, identifying the periodic time window includes identifying the periodic time window for the UE to access the network based on a data requirement for the UE, or a time when network access is desired by the UE, or a duration of network access desired by the UE, or a combination thereof.

Random access manager 730 may transmit, via transmitter 720 and to the network in a random access channel transmission, an indication of the identified periodic time window. Random access manager 730 may also transmit, to the network, an indication of an updated periodic time window in a second random access channel transmission. Random access manager 730 may further transmit, to the network, a random access channel report during the instance of the periodic time window.

Uplink resource manager 735 may receive, via receiver 710 and from the network based on the indication of the identified periodic time window, an indication of uplink resources allocated to wireless device 705 for wireless device 705 to access the network during the identified periodic time window.

Transmitter 720 may transmit signals generated by other components of the device. In some examples, transmitter 720 may be collocated with receiver 710 in a transceiver. For example, transmitter 720 may be an example of aspects of the transceiver 935 described with reference to FIG. 9. Transmitter 720 may utilize a single antenna or a set of antennas.

Figure 8:
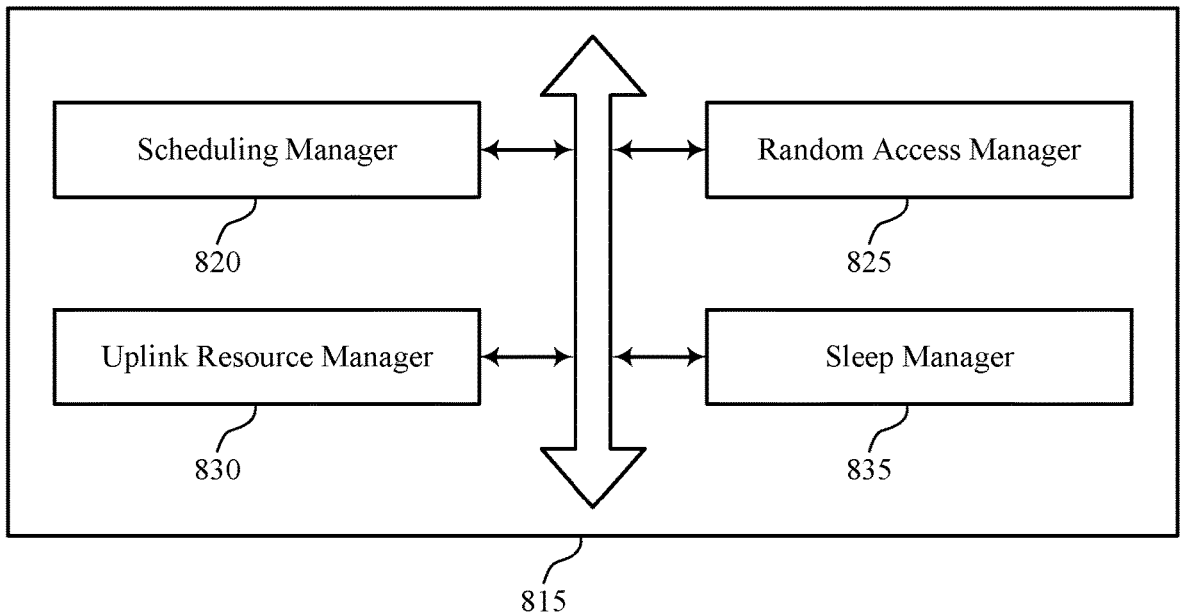

FIG. 8 shows a block diagram 800 of a UE communications manager 815 that supports enhanced random access and wake-up mechanism in accordance with aspects of the present disclosure. UE communications manager 815 may be an example of aspects of a UE communications manager 615, a UE communications manager 715, or a UE communications manager 915 described with reference to FIGS. 6, 7, and 9. UE communications manager 815 may include a scheduling manager 820, a random access manager 825, an uplink resource manager 830, and a sleep manager 835. Each of these modules may communicate, directly or indirectly, with one another (e.g., via one or more buses).

Scheduling manager 820 may identify a periodic time window to access a network, detect congestion in the network, and determine whether parameters for the periodic time window have changed. In some cases, identifying the periodic time window includes identifying a periodicity of the periodic time window based on a parameter of an application running on the UE. In some cases, the indication of the identified periodic time window includes an information element in the random access channel transmission. In some cases, identifying the periodic time window includes identifying the periodic time window for the UE to access the network based on a data requirement for the UE, or a time when network access is desired by the UE, or a duration of network access desired by the UE, or a combination thereof.

Random access manager 825 may transmit, via a transmitter and to the network in a random access channel transmission, an indication of the identified periodic time window. In some examples, random access manager 825 may transmit an indication of an updated periodic time window in a second random access channel transmission. Random access manager 825 may also transmit, to the network, a random access channel report during the instance of the periodic time window.

Uplink resource manager 830 may receive, from the network based on the indication of the identified periodic time window, an indication of uplink resources allocated to the UE for the UE to access the network during the identified periodic time window.

Sleep manager 835 may enter a sleep mode until an instance of the identified periodic time window or time slots based on the received indication of uplink resources. In some examples, the sleep mode exceeds a hyper system frame number (SFN) cycle for the UE. Sleep manager 835 may wake the UE for the instance of the periodic time window.

Figure 9:
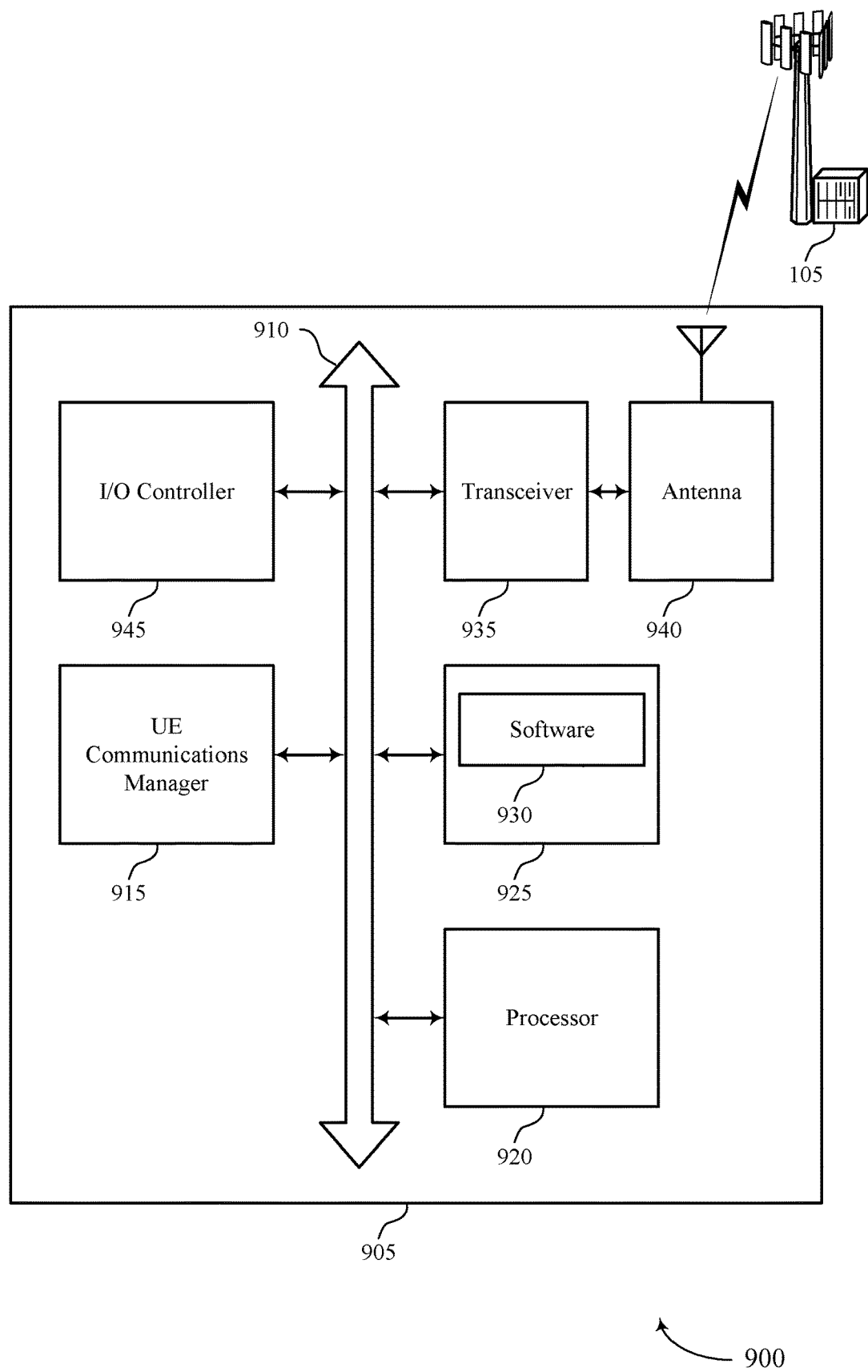
FIG. 9 illustrates a block diagram of a system including a UE that supports enhanced random access and wake-up mechanism in accordance with aspects of the present disclosure.

FIG. 9 shows a diagram of a system 900 including a device 905 that supports enhanced random access and wake-up mechanism in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting enhanced random access and wake-up mechanism).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support enhanced random access and wake-up mechanisms. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
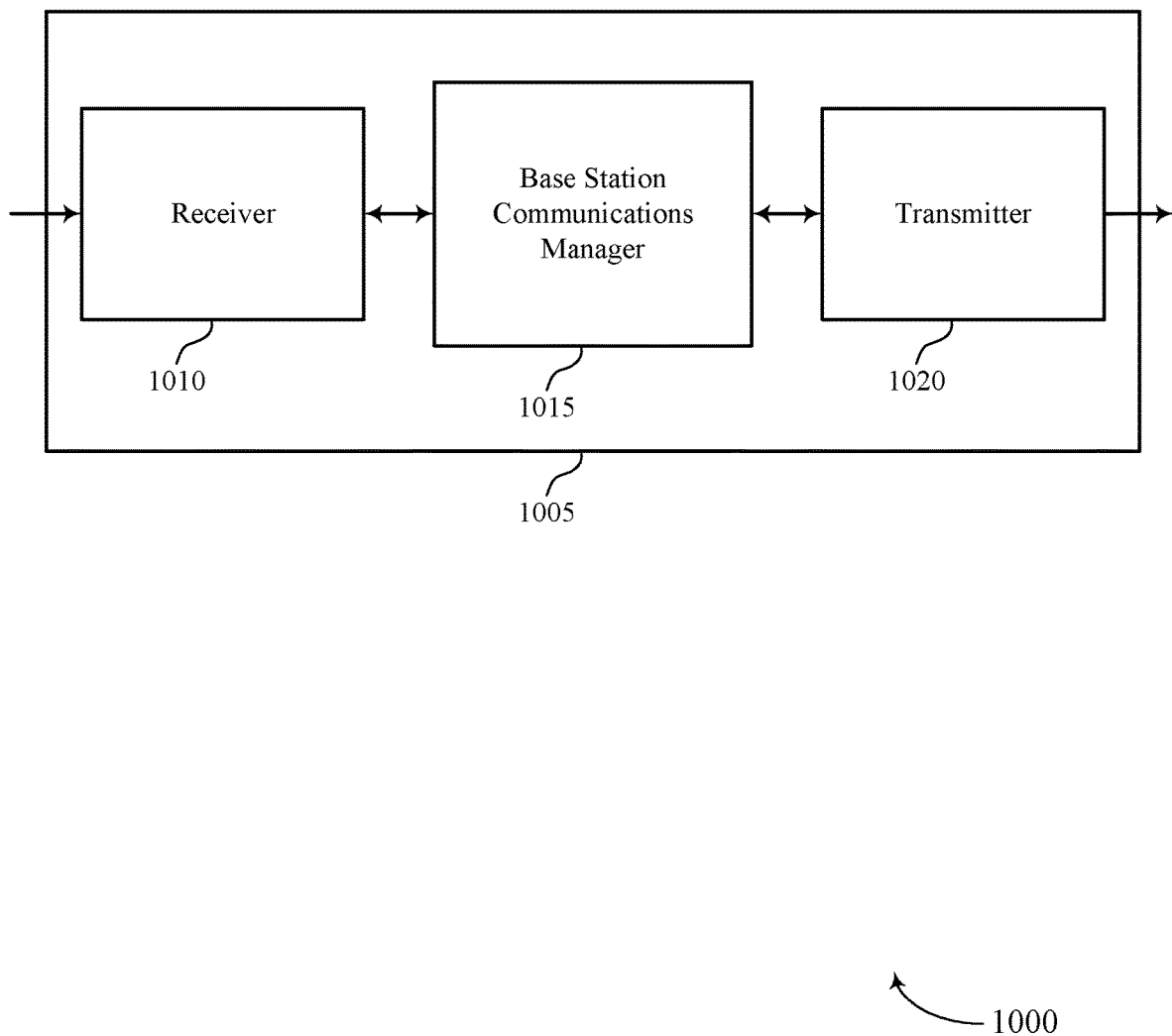
FIGS. 10 through 12 show block diagrams of a device that supports enhanced random access and wake-up mechanism in accordance with aspects of the present disclosure.

FIG. 10 shows a block diagram 1000 of a wireless device 1005 that supports enhanced random access and wake-up mechanisms in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to enhanced random access and wake-up mechanisms, etc.). Information may be passed on to other components of the wireless device 1005. Receiver 1010 may be an example of aspects of a transceiver 1335 described with reference to FIG. 13. Receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. Base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may receive, from a UE in a random access channel transmission, an indication of a periodic time window for the UE to access the network. Base station communications manager 1015 may determine, based on the received indication of the periodic time window, uplink resources for the UE to access the network during instances of the identified periodic time window. Base station communications manager 1015 may transmit, via transmitter 1020, an indication of the determined uplink resources to the UE.

Transmitter 1020 may transmit signals generated by other components of the device. In some examples, transmitter 1020 may be collocated with receiver 1010 in a transceiver. For example, transmitter 1020 may be an example of aspects of transceiver 1335 described with reference to FIG. 13. Transmitter 1020 may utilize a single antenna or a set of antennas.

Figure 11:
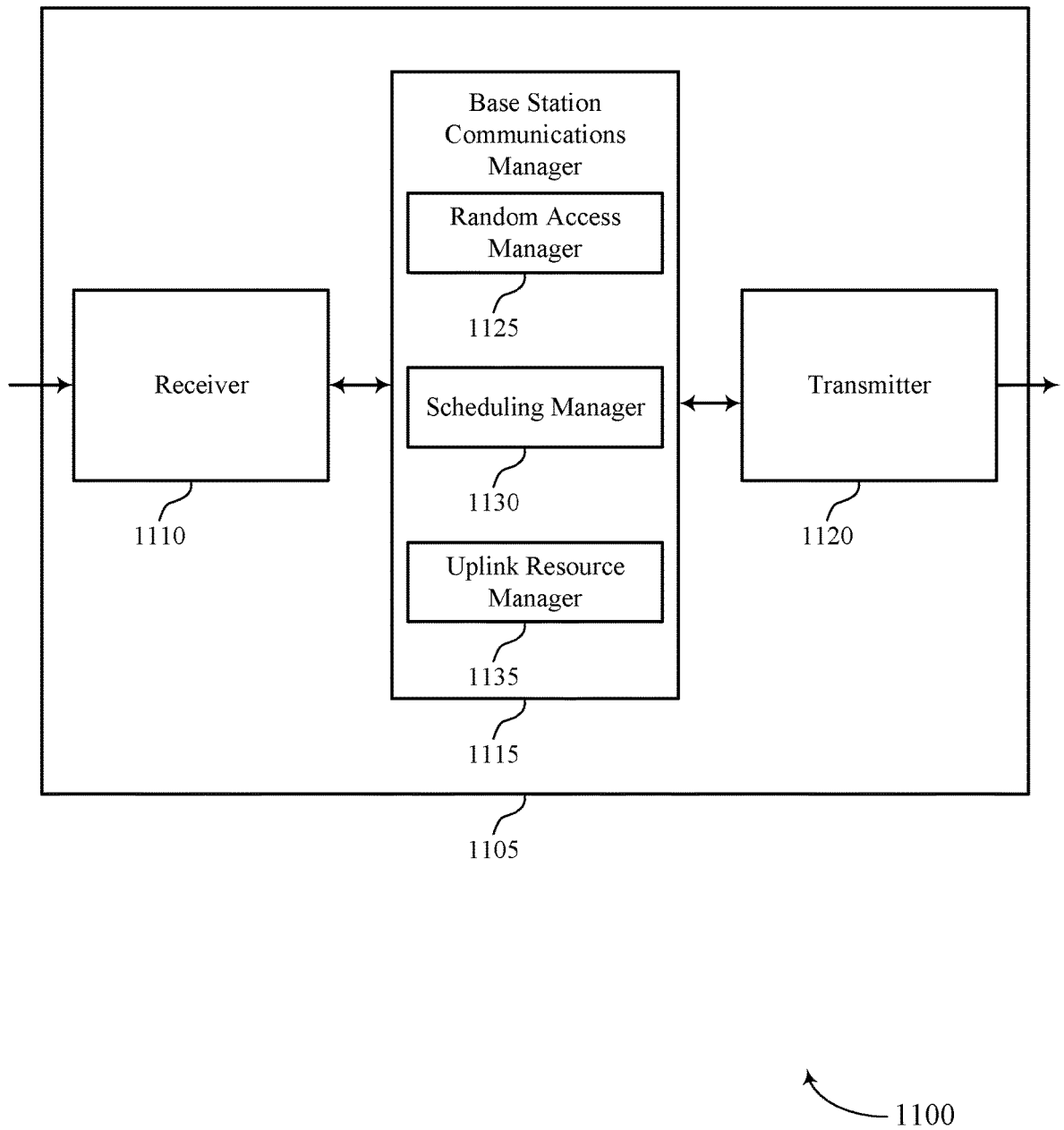

FIG. 11 shows a block diagram 1100 of a wireless device 1105 that supports enhanced random access and wake-up mechanism in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to enhanced random access and wake-up mechanism, etc.). Information may be passed on to other components of the device. Receiver 1110 may be an example of aspects of the transceiver 1335 described with reference to FIG. 13. Receiver 1110 may utilize a single antenna or a set of antennas.

Base station communications manager 1115 may be an example of aspects of the base station communications manager 1315 described with reference to FIG. 13.

Base station communications manager 1115 may also include random access manager 1125, scheduling manager 1130, and uplink resource manager 1135.

Random access manager 1125 may receive, from a UE in a random access channel transmission, an indication of a periodic time window for the UE to access the network and receive, from the UE, an indication of an updated periodic time window in a second random access channel transmission.

Scheduling manager 1130 may determine, based on the received indication of the periodic time window, uplink resources for the UE to access the network during instances of the identified periodic time window. Scheduling manager 1130 may also determine periodic time windows for at least one additional UE, where determining uplink resources for the UE is based at least in part on the determined periodic time windows for the at least one additional UE. Scheduling manager 1130 may transmit, via transmitter 1120, an indication of an increased barring time for the UE based on the received indication of the periodic time window. Scheduling manager 1130 may also determine, based on the updated periodic time window, updated uplink resources for the UE.

Uplink resource manager 1135 may transmit, via transmitter 1120, an indication of the determined (or updated) uplink resources.

Transmitter 1120 may transmit signals generated by other components of the device. In some examples, transmitter 1120 may be collocated with a receiver 1110 in a transceiver. For example, transmitter 1120 may be an example of aspects of transceiver 1335 described with reference to FIG. 13. Transmitter 1120 may utilize a single antenna or a set of antennas.

Figure 12:
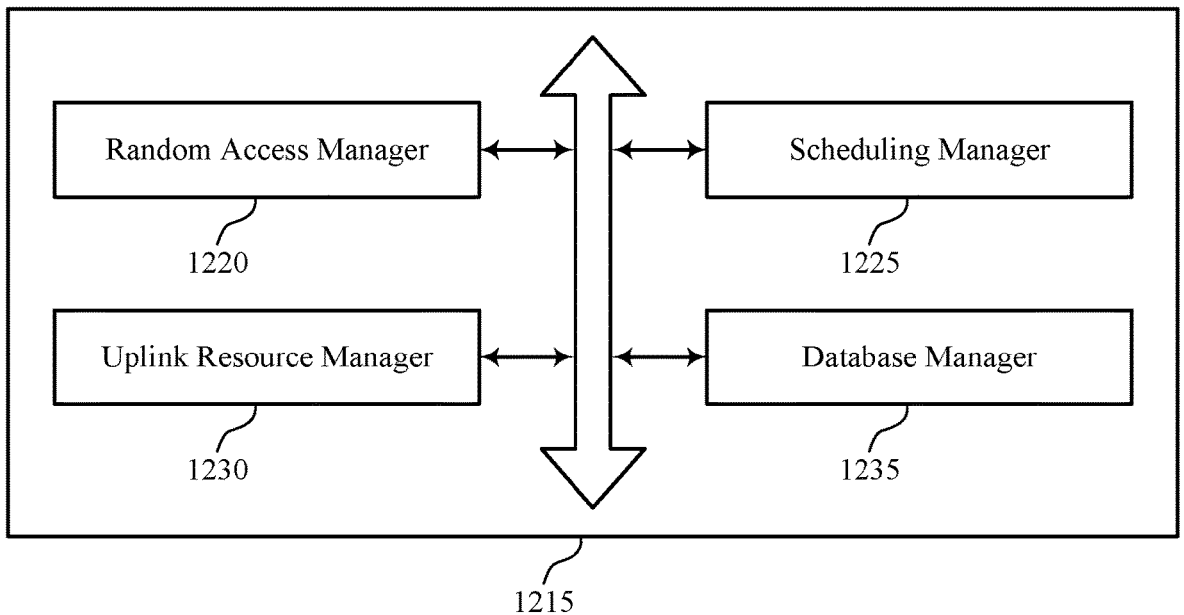

FIG. 12 shows a block diagram 1200 of a base station communications manager 1215 that supports enhanced random access and wake-up mechanism in accordance with aspects of the present disclosure. Base station communications manager 1215 may be an example of aspects of a base station communications manager 1315 described with reference to FIGS. 10, 11, and 13. Base station communications manager 1215 may include a random access manager 1220, a scheduling manager 1225, an uplink resource manager 1230, and a database manager 1235. Each of these modules may communicate, directly or indirectly, with one another (e.g., via one or more buses).

Random access manager 1220 may receive, via a receiver and from a UE in a random access channel transmission, an indication of a periodic time window for the UE to access the network. Random access manager 1220 may also receive, via a receiver and from the UE, an indication of an updated periodic time window in a second random access channel transmission.

Scheduling manager 1225 may determine, based on the received indication of the periodic time window, uplink resources for the UE to access the network during instances of the identified periodic time window. Scheduling manager 1225 may also determine periodic time windows for at least one additional UE, where determining uplink resources for the UE is based on the determined periodic time windows for the at least one additional UE. Scheduling manager 1225 may transmit, via a transmitter, an indication of an increased barring time for the UE based on the received indication of the periodic time window. Scheduling manager 1225 may also determine, based on the updated periodic time window, updated uplink resources for the UE.

Uplink resource manager 1230 may transmit, to the UE, an indication of the determined uplink resources and transmit, to the UE, an indication of the updated uplink resources.

Database manager 1235 may store the periodic time window for the UE with an identifier of the UE. Database manager 1235 may update the stored periodic time window for the UE if the periodic time window changes.

Figure 13:
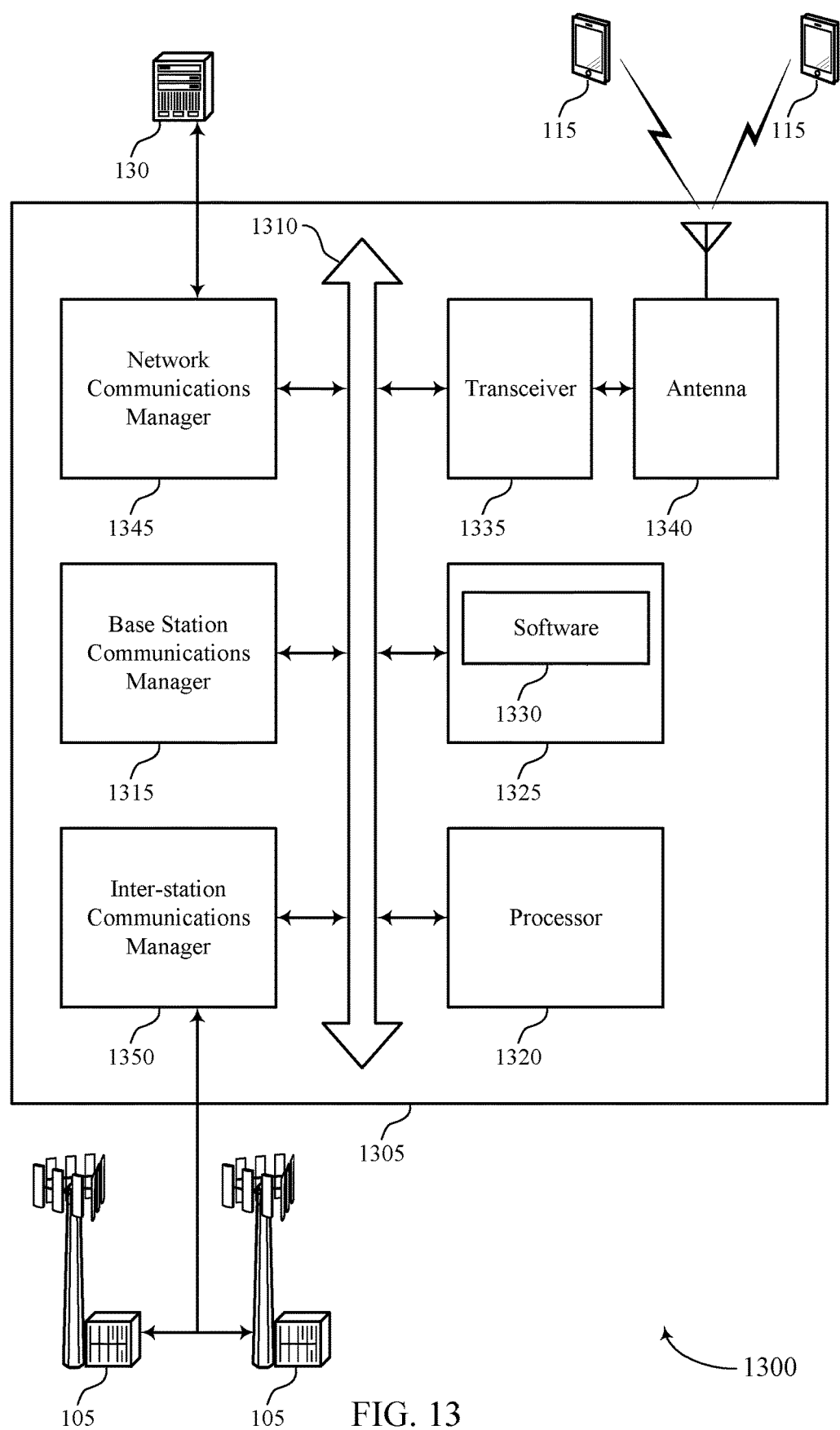
FIG. 13 illustrates a block diagram of a system including a base station that supports enhanced random access and wake-up mechanism in accordance with aspects of the present disclosure.

FIG. 13 shows a diagram of a system 1300 including a device 1305 that supports enhanced random access and wake-up mechanisms in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting enhanced random access and wake-up mechanism).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support enhanced random access and wake-up mechanism. Software 1330 may be stored in a non-transitory computer-readable medium such as system memory or other memory. In some cases, software 1330 may not be directly executable by the processor but may cause a computer (e.g., when compiled and executed) to perform functions described herein.

Transceiver 1335 may communicate bi-directionally, via one or more antennas, wired, or wireless links as described above. For example, transceiver 1335 may represent a wireless transceiver and may communicate bi-directionally with another wireless transceiver. Transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
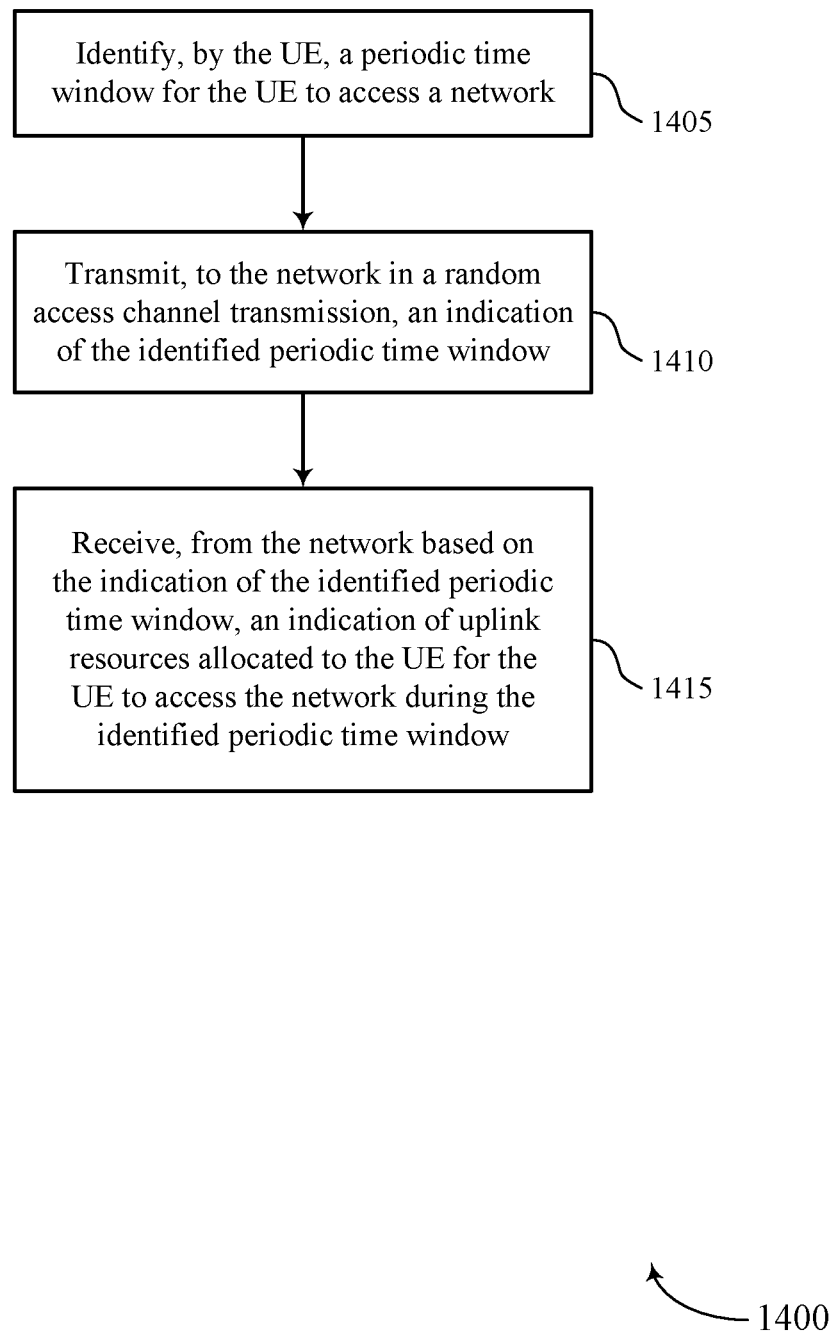
FIGS. 14 and 15 illustrate methods for enhanced random access and wake-up mechanism in accordance with aspects of the present disclosure.

FIG. 14 shows a flowchart illustrating a method 1400 for enhanced random access and wake-up mechanism in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405, UE 115 may identify a periodic time window for the UE 115 to access a network. The operations of block 1405 may be performed according to the methods described herein. In certain examples, aspects of the operations of block 1405 may be performed by a scheduling manager as described with reference to FIGS. 6 through 9.

At block 1410, UE 115 may transmit, to the network in a random access channel transmission, an indication of the identified periodic time window. The operations of block 1410 may be performed according to the methods described herein. In certain examples, aspects of the operations of block 1410 may be performed by a random access manager as described with reference to FIGS. 6 through 9.

At block 1415, UE 115 may receive, from the network based at least in part on the indication of the identified periodic time window, an indication of uplink resources allocated to the UE 115 for it to access the network during the identified periodic time window. The operations of block 1415 may be performed according to the methods described herein. In certain examples, aspects of the operations of block 1415 may be performed by a uplink resource manager as described with reference to FIGS. 6 through 9.

Figure 15:
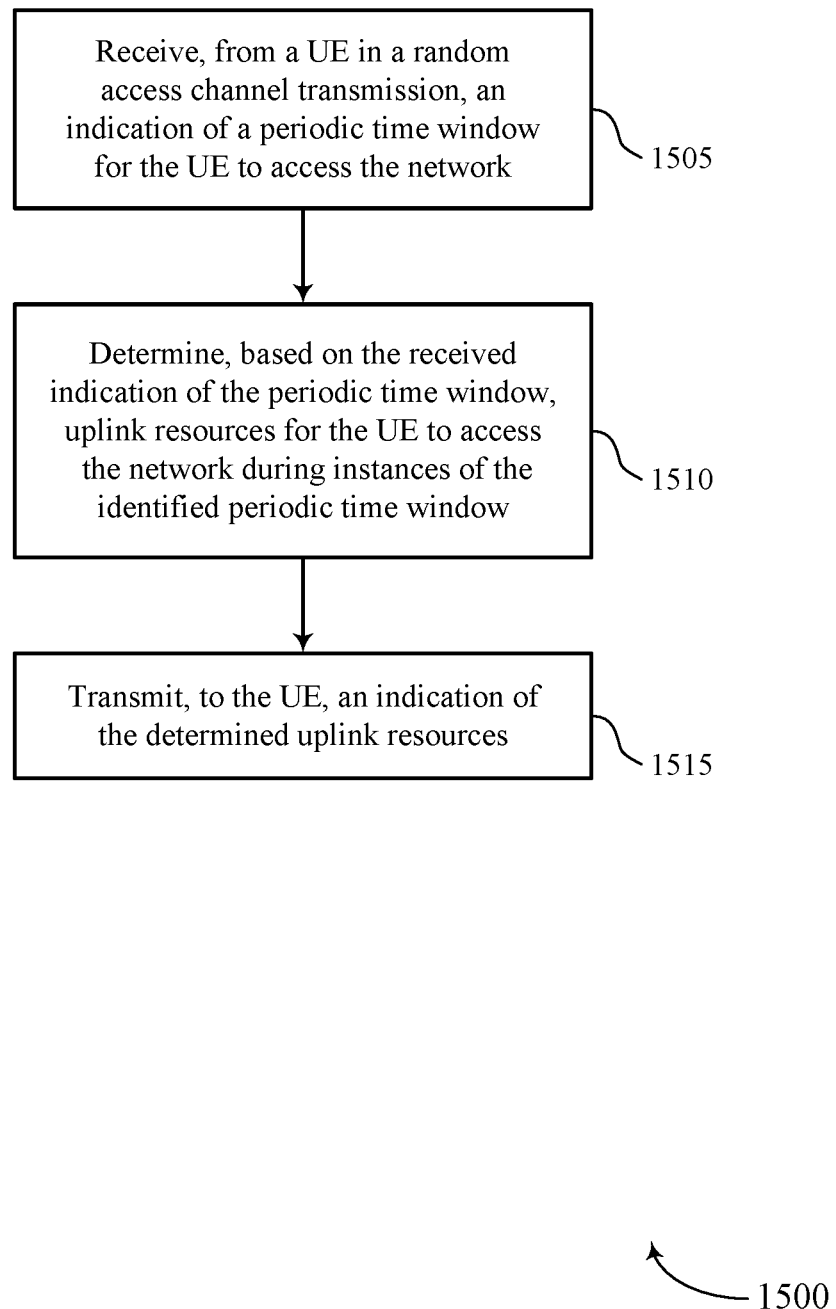

FIG. 15 shows a flowchart illustrating a method 1500 for enhanced random access and wake-up mechanism in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505, base station 105 may receive, from a UE in a random access channel transmission, an indication of a periodic time window for the UE to access the network. The operations of block 1505 may be performed according to the methods described herein. In certain examples, aspects of the operations of block 1505 may be performed by a random access manager as described with reference to FIGS. 10 through 13.

At block 1510, base station 105 may determine, based at least in part on the received indication of the periodic time window, uplink resources for the UE to access the network during instances of the identified periodic time window. The operations of block 1510 may be performed according to the methods described herein. In certain examples, aspects of the operations of block 1510 may be performed by a scheduling manager as described with reference to FIGS. 10 through 13.

At block 1515, base station 105 may transmit, to the UE, an indication of the determined uplink resources. The operations of block 1515 may be performed according to the methods described herein. In certain examples, aspects of the operations of block 1515 may be performed by a uplink resource manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from 3GPP. CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   detecting, by the UE, congestion in a network;
   performing data mining to determine a time that the UE performs random access to access the network;
   identifying, by the UE, a periodic time window for the UE to access the network, wherein a period of the periodic time window is determined based at least in part on a parameter of an application running on the UE, the detected congestion, and the determined time;
   transmitting, to the network in a random access channel transmission, an indication of the identified periodic time window;
   receiving, from the network based at least in part on the indication of the identified periodic time window, an indication of uplink resources allocated to the UE for the UE to access the network during the identified periodic time window; and
   entering, by the UE, a sleep mode until an instance of the identified periodic time window based at least in part on the received indication of uplink resources.

2. The method of claim 1, further comprising:
   determining, by the UE, that parameters for the periodic time window have changed; and
   transmitting, to the network, an indication of an updated periodic time window in a second random access channel transmission.

3. The method of claim 1, wherein the indication of the identified periodic time window comprises an information element in the random access channel transmission.

4. The method of claim 1, wherein identifying the periodic time window comprises:
   identifying the periodic time window for the UE to access the network based at least in part on a data requirement for the UE, or a time when network access is desired by the UE, or a duration of network access desired by the UE, or a combination thereof.

5. The method of claim 1, wherein the UE is an Internet-of-Things device that has a maximum network speed cap of 10 megabits per second.

6. The method of claim 1, wherein entering the sleep mode until the instance of the identified periodic time window skips a hyper system frame number (SFN) cycle.

7. An apparatus for wireless communication, comprising:
a processor;
memory in electronic communication with the processor; and
instructions stored in the memory and operable, when executed by the processor, to cause the apparatus to:
detect congestion in a network;
perform data mining to determine a time that the UE performs random access to access the network;
identify a periodic time window for the UE to access the network, wherein a period of the periodic time window is determined based at least in part on a parameter of an application running on the UE, of the detected congestion, and the determined time;
transmit, to the network in a random access channel transmission, an indication of the identified periodic time window;
receive, from the network based at least in part on the indication of the identified periodic time window, an indication of uplink resources allocated to the apparatus for the apparatus to access the network during the identified periodic time window; and
enter, by the UE, a sleep mode until an instance of the identified periodic time window based at least in part on the received indication of uplink resources.

8. The apparatus of claim 7, wherein the instructions are further executable by the processor to:
determine that parameters for the periodic time window have changed; and
transmit, to the network, an indication of an updated periodic time window in a second random access channel transmission.

9. The apparatus of claim 7, wherein the indication of the identified periodic time window comprises an information element in the random access channel transmission.

10. The apparatus of claim 7, wherein identifying the periodic time window comprises:
identifying the periodic time window for the apparatus to access the network based at least in part on a data requirement for the apparatus, or a time when network access is desired by the apparatus, or a duration of network access desired by the apparatus, or a combination thereof.

11. The apparatus of claim 7, wherein the apparatus is an Internet-of-Things device that has a maximum network speed cap of 10 megabits per second.

12. The apparatus of claim 7, wherein entering the sleep mode until the instance of the identified periodic time window skips a hyper system frame number (SFN) cycle.

13. A method for wireless communication at a network device of a network, comprising:
receiving, from a user equipment (UE) in a random access channel transmission, an indication of a periodic time window for the UE to access the network, wherein a period of the periodic time window is determined based at least in part on a parameter of an application running on the UE, congestion in the network, and data mining to determine a time that the UE performs random access to access the network;
determining, based at least in part on the received indication of the periodic time window, uplink resources for the UE to access the network during instances of the identified periodic time window;
transmitting, to the UE, an indication of the determined uplink resources; and
determining that the UE is entering a sleep mode until an instance of the identified periodic time window based at least in part on the transmitted indication of the determined uplink resources.

14. The method of claim 13, further comprising:
storing an indication of the periodic time window for the UE with an identifier of the UE.

15. The method of claim 13, further comprising:
receiving, from the UE, an indication of an updated periodic time window in a second random access channel transmission;
determining, based at least in part on the updated periodic time window, updated uplink resources for the UE; and
transmitting, to the UE, an indication of the updated uplink resources.

16. The method of claim 15, further comprising:
storing an updated indication of the updated periodic time window for the UE with an identifier of the UE.

17. An apparatus for wireless communication, comprising:
a processor;
memory in electronic communication with the processor; and
instructions stored in the memory and operable, when executed by the processor, to cause the apparatus to:
receive, from a user equipment (UE) in a random access channel transmission, an indication of a periodic time window for the UE to access the network, wherein a period of the periodic time window is determined based at least in part on a parameter of an application running on the UE, congestion in the network, and data mining to determine a time that the UE performs random access to access the network;
determine, based at least in part on the received indication of the periodic time window, uplink resources for the UE to access the network during instances of the identified periodic time window;
transmit, to the UE, an indication of the determined uplink resources; and
determine that the UE is entering a sleep mode until an instance of the identified periodic time window based at least in part on the transmitted indication of the determined uplink resources.

18. The apparatus of claim 17, wherein the instructions are further executable by the processor to:
store an indication of the periodic time window for the UE with an identifier of the UE.

19. The apparatus of claim 17, wherein the instructions are further executable by the processor to:
receive, from the UE, an indication of an updated periodic time window in a second random access channel transmission;
determine, based at least in part on the updated periodic time window, updated uplink resources for the UE; and
transmit, to the UE, an indication of the updated uplink resources.

* * * * *